Figure 1:
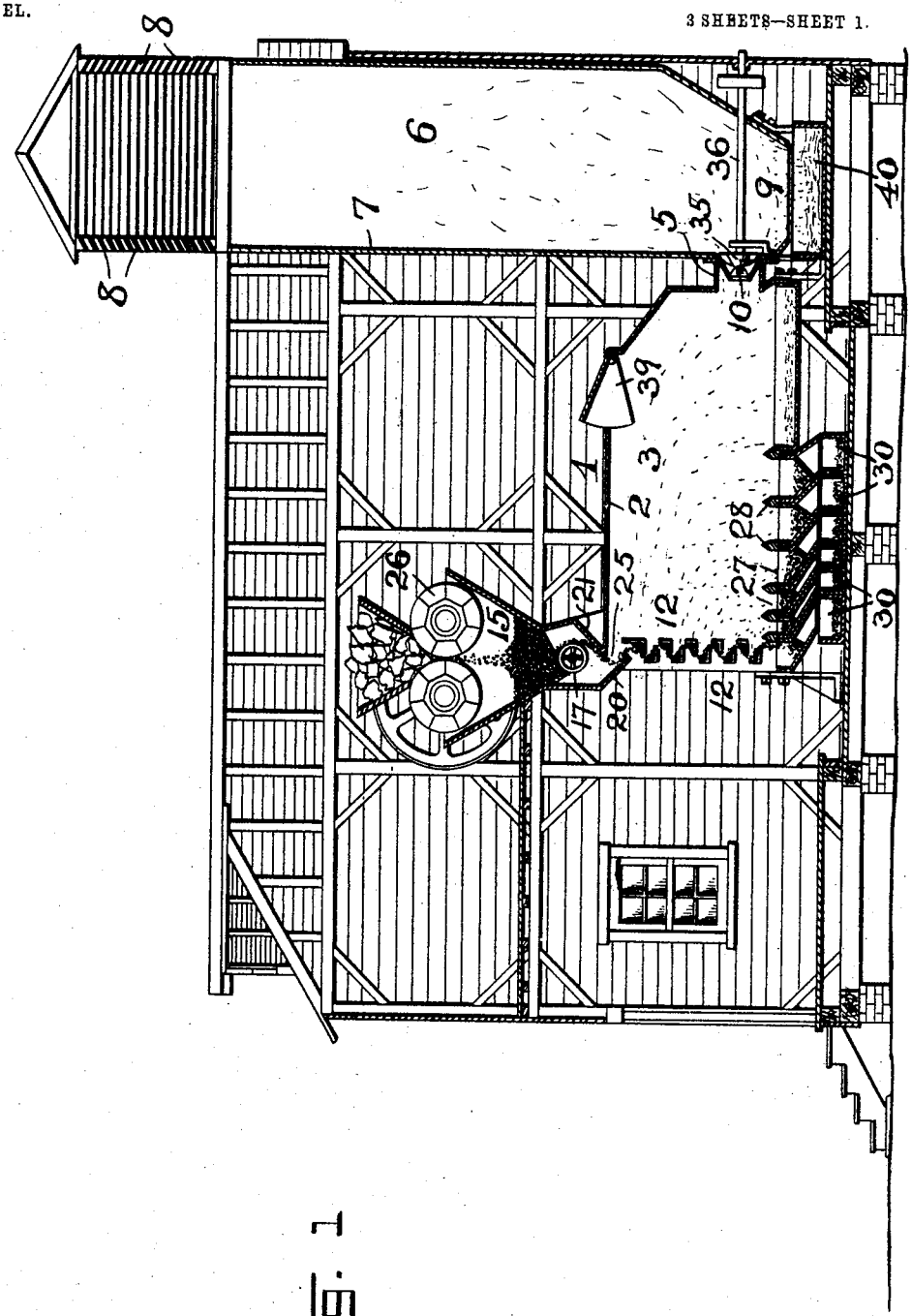

No. 775,004. PATENTED NOV. 15, 1904.
C. T. FREID.
SEPARATOR.
APPLICATION FILED JULY 2, 1903.
NO MODEL. 3 SHEETS—SHEET 3.

WITNESSES:
Geo. D. Richards
W. B. Fraentzel

INVENTOR:
Calvin T. Freid,
BY Fredk C. Fraentzel,
ATTORNEY

No. 775,004.                                                   Patented November 15, 1904.

UNITED STATES PATENT OFFICE.

CALVIN T. FREID, OF WEST ORANGE, NEW JERSEY, ASSIGNOR TO FREID ENGINEERING COMPANY, A CORPORATION OF NEW JERSEY.

SEPARATOR.

SPECIFICATION forming part of Letters Patent No. 775,004, dated November 15, 1904.

Application filed July 2, 1903. Serial No. 163,987. (No model.)

*To all whom it may concern:*

Be it known that I, CALVIN T. FREID, a citizen of the United States, residing at West Orange, in the county of Essex and State of New Jersey, have invented certain new and useful Improvements in Separators; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

My present invention has reference to improvements in separators; and the invention has for its principal objects to provide a simple, economical, and efficient apparatus or machine in which the lighter and smaller particles of matter are separated from the heavier and larger particles at different points, such separated particles of matter being collected in different receptacles, such as conveyer-ducts, or in boxes.

Other objects of this invention will appear hereinafter from the following detailed description of this invention, the invention being especially designed to provide an arrangement of mechanism and devices with a view of quickly and easily effecting the process of separating the particles of matter at a minimum expenditure of cost and power.

The invention consists generally in the separating apparatus hereinafter set forth, and, furthermore, this invention consists in the various features and combinations of devices and their parts, all of which will be described in detail in the following specification and then finally embodied in the clauses of the claim which are appended to and form a part of this specification.

The apparatus embodying the principles of the present invention in general comprises a main action or separating chamber, a settling-chamber, preferably in the form of a stack, a screw-propeller or exhausting-fan between said chambers, means to regulate the pressure of air in the action-chamber, a series of suitably-arranged baffles or separating-plates upon which the particles of material to be separated are conducted and separated by the currents of air drawn above and between the said baffles. The baffles or separator-plates are so arranged that the particles of matter are divided at different points, the separated material or matter being conducted, preferably, to self-closing chutes, which keep the action-chamber closed when no material is drawn over the separating-partitions, but which open automatically when a sufficient quantity of the separated material has been collected to discharge the same into a conveyer chute or duct or other suitable receiver, to be conveyed to any suitable point outside of the separator without changing the uniform pressure within the main action or separating chamber of the apparatus. The said settling chamber or stack is provided with a series of louvers or other suitable means to allow the atmospheric pressure to equalize the pressure within the settling-chamber, whereby the fine particles or dust of the matter or material separated, and which are drawn through the exhaust-fan, are caused to settle to the bottom of said settling-chamber, where they are collected in a suitable receptacle at that point, and, finally, there is employed in connection with the apparatus a suitable feeding device so arranged above the baffles or separator-plates that the material which is to be separated is fed in uniform quantity and in a steady stream upon the top baffle or separator-plate and then flows from the uppermost baffle to the next lower baffle, and so on from baffle to baffle, with a sufficient current of air being drawn between the said baffles or separator-plates and over the material that its various particles of different degrees of lightness and weights are readily separated and collected in the various receiving ducts or chutes or other receptacles.

Of course it will be understood that the above is but one arrangement and enumeration of devices to be used with the apparatus, and the arrangements and combinations of said devices may be varied and some of them may be entirely omitted, as will hereinafter appear.

My invention is clearly illustrated in the accompanying drawings, in which—

Figure 2:
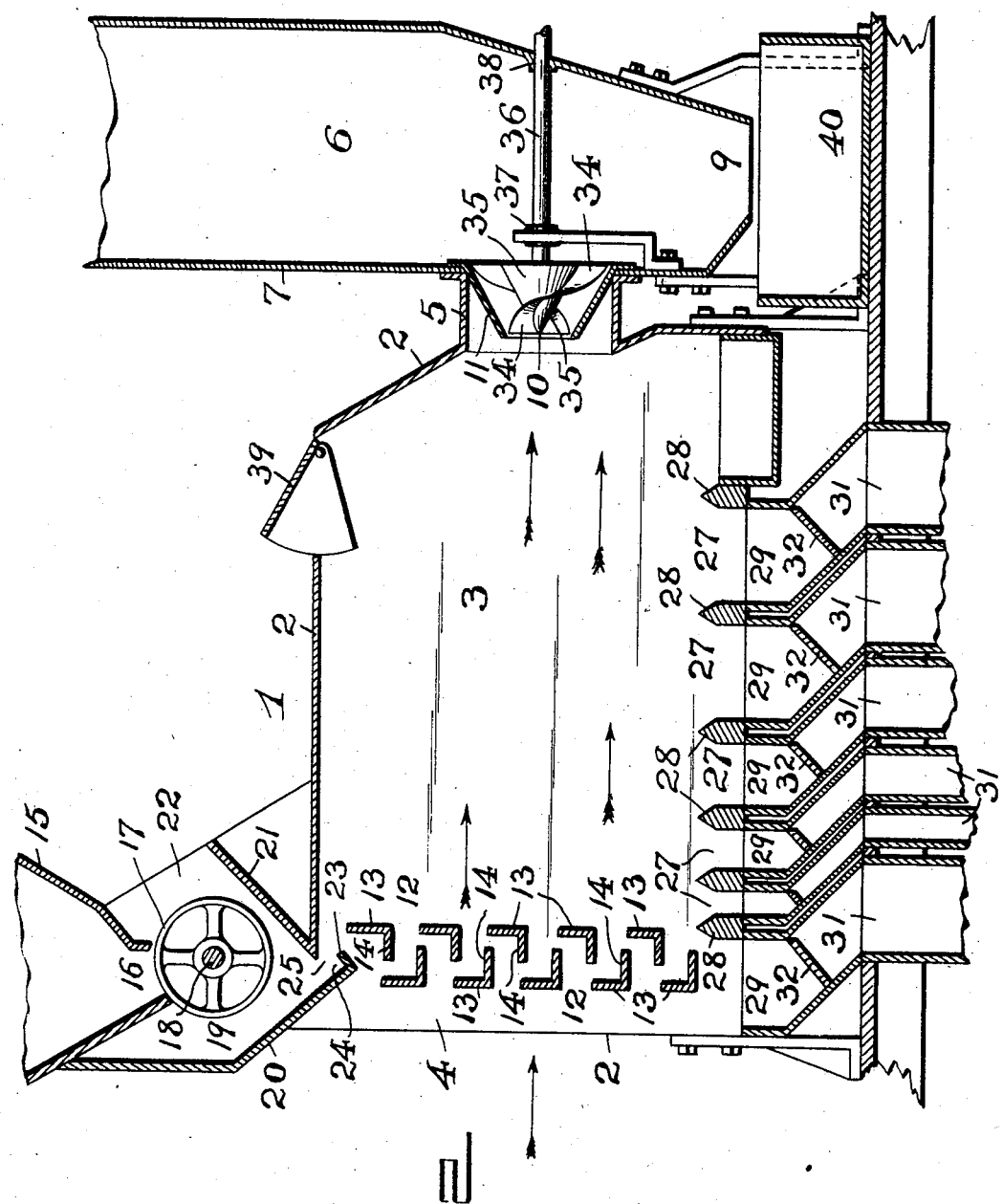
Figure 3:
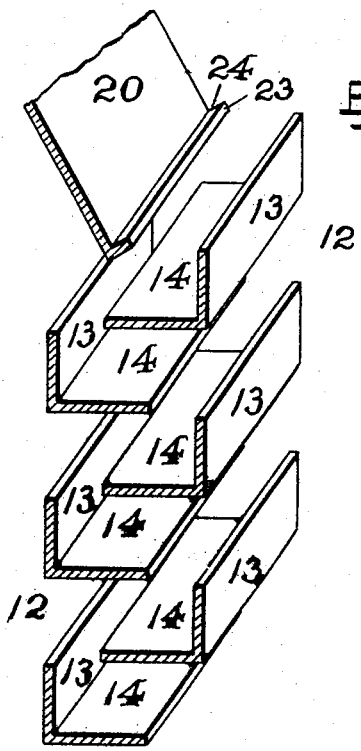
Figure 4:
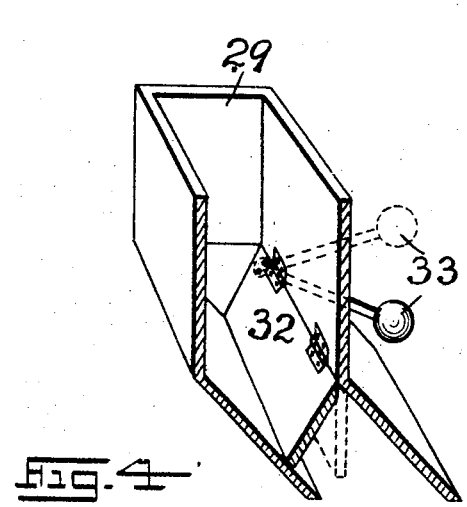
Figure 5:
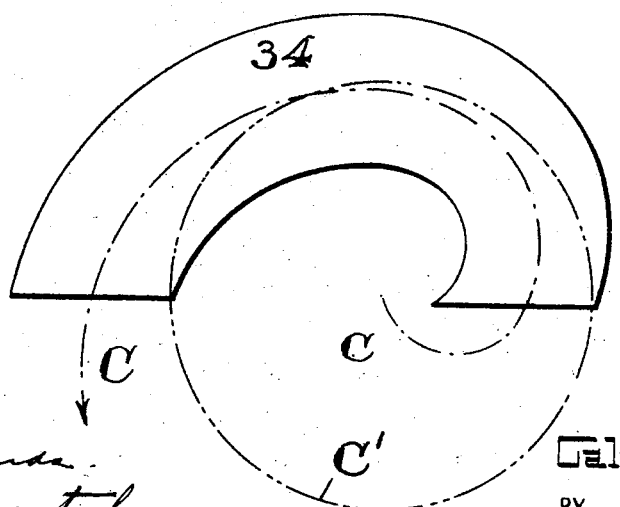

Figure 1 is a sectional representation of a separating plant provided with a separator embodying the principles of this invention and a crusher employed with said separator, said separator and crusher being both illustrated in longitudinal vertical section. Fig. 2 is a longitudinal vertical section of the separator, on an enlarged scale. Fig. 3 is a detail view in perspective of the baffles or separator-plates. Fig. 4 is a perspective view of one of the self-closing gates employed with the chutes represented in said Fig. 2, and Fig. 5 is a plan view of a non-cavitating propeller-blade used with the exhauster or fan represented in Figs. 1 and 2 of the drawings.

Similar characters of reference are employed in all of the said above-described views to indicate corresponding parts.

Referring now to the several figures of the drawings, the reference-character 1 indicates the complete separator, which comprises a suitable casing 2, forming a main action or separating chamber 3, having an open end 4, forming an air intake or inlet at the one end of said casing and provided with an outlet 5 at the other end of said casing. Connected with the said outlet 5 is an open portion of a settling-chamber 6, preferably made in the form of a stack 7, having louvers 8 at the top and an outlet 9 at the bottom. In the said outlet 5 and the connecting-opening of the said settling-chamber 6 is arranged a shell or casing 11 of an exhaust fan or propeller 10 of the arrangement and construction of blades to be hereinafter more particularly specified.

At or near the open end 4 of the casing 2 are any desirable number of baffles or separator-plates 12, each baffle comprising a pair of angular sides or members 13 and 14, forming in cross-section the letter L and arranged in such a manner one above the other that the open portions of the vertically-disposed plates 12 will face successively in opposite directions, as clearly illustrated.

Directly above the uppermost baffle or separator-plate 12 is a feeding device or hopper 15, having an opening 16 directly above and in close proximity to a feed-roll 17. This feed-roll is arranged upon a shaft 18, driven from any suitable source of power and revolves in the chambered part 19, formed by the inclined sides of the bottom of the hopper 15 and the inclined members 20 and 21 and sides 22, as clearly illustrated. The member 20 is also made along its lower edge with an upwardly-extending shoulder 23, which forms an angle 24 contiguous to and forming a portion of the discharge-outlet 25.

When the apparatus is in operation, the material whose particles are to be separated passes from a suitable crusher into said hopper or feeding device or it is directed from any other suitable source into said hopper and is fed in a constant stream from the feed-roll 17 into the angle 24, where the flow of the material is slightly retarded. When the angle 24 fills up level, the overflow passes through the outlet 25 and falls upon the upper baffle, where it remains and fills up the baffle, so that the material will rest there at a natural angle of repose. The overflow continues to fall upon the next lower baffle, filling the latter in the same manner, the overflow continuing to fill all the baffles, as will be clearly understood. The rotation of the propeller causes a draft of air in the direction of the arrows, (indicated in Fig. 2 of the drawings,) and as the continual overflow of the material passes from baffle to baffle the lighter and smaller particles of material are separated from the larger and heavier particles, all being drawn into the chamber 3, the various particles of material being deflected, due to action, into suitable receiving-openings 27 between suitably-disposed partitions 28 in the bottom portion of the said action-chamber 3. Connected with each receiving opening 27 and attached to the lower portions of said partitions 28 are receptacles 29, terminating directly above other receptacles, 30, in the form of boxes, as indicated in Fig. 1, or connected with suitable conveyer ducts or chutes 31 of any desirable shapes and sizes, as clearly illustrated in Fig. 2 of the drawings, for conveying the separated particles of material to any desired point.

Each receptacle 29 is of such construction that the separated particles of material will lie upon a hinged gate 32 in the receptacle, which, as will be seen from an inspection of Fig. 4, remains closed, due to a counterweight 33, until the weight of the collected material exceeds that of the weight 33 and causes the gate 32 to swing open, (indicated in dotted outline in said figure,) which is far enough to allow the material to pass through the opening in the bottom of said receptacle 29 into the box 30 or the chute 31, as will be clearly evident. As soon as the material has been discharged the counterweight 33 again closes the gate 32.

The suction of the air and its proper action through the action-chamber 3 is created by the non-cavitating screw-propeller or exhaust-fan hereinabove mentioned, the blade or blades 34 of said propeller being spirally formed upon a cone-shaped body 35 on the driving shaft or spindle 36. The blade 34 is shown more particularly in Figs. 2 and 5 and is designed that its entire area follows the line of centrifugal force C, due to the mass of air moved, the torque on which it is caused to move, and the speed of the average torque, in feet, (indicated by the spiral line C and the radial line C' in said Fig. 5.)

The propeller being overhung on the shaft 36 and the bearings 37 and 38 for the said shaft being outside of the separator or action chamber 3, they are kept free from dirt and grit.

The action or flow of the air created in the action-chamber 3 can be regulated by an arrangement of valve or gate 39 in the top of said casing 2 by opening or closing said gate 39 to regulate the opening and whereby the pressure in said chamber 3 may be reduced or increased to any desired degree as may become necessary.

The louvers 8 in the settling chamber or stack are for the purpose of allowing atmospheric pressure to be exerted directly against the force of the propeller or fan to balance the air contained in the settling-chamber 6 and allow the fine particles which are drawn through the propeller to be received and to settle in a compartment 40 in the bottom of said chamber 6.

From an inspection of Fig. 1 of the drawings it will clearly be seen that the largest and heaviest particles of material treated in the manner above stated will continue down the baffles or separator-plates and will be conveyed directly into the first receiver beneath the column of baffles, while the other grades of separated particles of material will successively be received by the remaining receivers, being graduated according to size and weight that the smallest particles in size and weight will be farthest away from the said column of baffles and the intermediate sizes and weights of the particles will be received in the receivers arranged between the respective end receivers.

It will be understood that various changes may be made in the general arrangements and combinations of the devices and their parts as well as in the details of the construction of the same without departing from the scope of my present invention. Hence I do not limit my invention to the exact arrangements and combinations of the devices and parts as described in the foregoing specification and as illustrated in the accompanying drawings, nor do I confine myself to the exact details of the construction of the said parts.

Having thus described my invention, what I claim is—

1. A separator comprising a casing forming an action-chamber having an air-intake substantially equal to the cross-area of the said action-chamber, and said chamber being provided with a reduced outlet, a series of material-separating devices back of the said intake consisting of vertically-staggered horizontal plates upon which the material to be separated is deposited and drops by gravity from one plate to another, means connected with each plate for causing a portion of the material to come to rest upon said plates and form inclines, each incline representing the hypotenuse of a triangle, and causing the mass of the material to move down continuously, but successively in opposite directions from the edges of the respective plates, and means connected with the action-chamber for producing a suction of air through the sinuous sheet of falling material and through the chamber in a direction from the said intake to the said outlet, substantially as and for the purposes set forth.

2. A separator, comprising, a casing forming an action-chamber, means connected with said chamber for collecting the separated particles of material, a series of baffles staggered on the line of gravity, having horizontally-disposed shelf members and right-angled members extending from the oppositely-located edges of the adjacent horizontal shelf members, whereon the matter to be separated falls and comes to rest, and means for producing currents of air between said baffles to deflect the lighter and smaller particles of matter from the heavier and larger particles, substantially as and for the purposes set forth.

3. A separator, comprising, a casing forming an action-chamber, means connected with said chamber for collecting the separated particles of material, a series of baffles staggered on the line of gravity, having horizontally-disposed shelf members and right-angled members extending from the oppositely-located edges of the adjacent horizontal shelf members, whereon the matter to be separated falls and comes to rest, and a balanced non-cavitating exhaust fan or propeller for producing current of air between said baffles and over the entire area of the air-intake of said action-chamber to deflect the lighter and smaller particles of matter from the heavier and larger particles, substantially as and for the purposes set forth.

4. A separator comprising a casing forming an action-chamber provided with an air-inlet and an air-outlet, means connected with said chamber for collecting the separated particles of material, a series of baffles staggered on the line of gravity, having horizontally-disposed shelf members and right-angled members extending from the oppositely-located edges of the adjacent horizontal shelf members, whereon the matter to be separated falls and comes to rest, and an exhaust fan or propeller located in said outlet, consisting, essentially, of a frusto-conical hollow shell, a shaft, a cone-shaped body on said shaft, and spirally-arranged propeller-blades upon the said cone-shaped body extending from the apex of the said cone-shaped body in directions toward the base of said cone-shaped body, and the marginal helical edges of said blades at all points being equidistant from the conical surface of said cone-shaped body, substantially as and for the purposes set forth.

In testimony that I claim the invention set forth above I have hereunto set my hand this 26th day of June, 1903.

CALVIN T. FREID.

Witnesses:
 FREDK. C. FRAENTZEL,
 GEO. D. RICHARDS.